(12) United States Patent
Chen et al.

(10) Patent No.: US 8,688,741 B2
(45) Date of Patent: Apr. 1, 2014

(54) DEVICE DESCRIPTION FRAMEWORK INFORMATION REPORTING AND UPDATING METHOD, DEVICE AND SYSTEM

(75) Inventors: Daqing Chen, Beijing (CN); Jun Ma, Beijing (CN); Chuan Yu, Beijing (CN); Yilang Cen, Beijing (CN)

(73) Assignee: China Mobile Communications Corporation, Beijing (CN)

( * ) Notice: Subject to any disclaimer, the term of this patent is extended or adjusted under 35 U.S.C. 154(b) by 135 days.

(21) Appl. No.: 13/057,091

(22) PCT Filed: Jul. 29, 2009

(86) PCT No.: PCT/CN2009/000847
§ 371 (c)(1), (2), (4) Date: Mar. 1, 2011

(87) PCT Pub. No.: WO2010/012157
PCT Pub. Date: Feb. 4, 2010

(65) Prior Publication Data
US 2011/0145294 A1    Jun. 16, 2011

(30) Foreign Application Priority Data
Aug. 1, 2008 (CN) .......................... 2008 1 0117599

(51) Int. Cl.
*G06F 17/30* (2006.01)
(52) U.S. Cl.
USPC ........................................................ 707/792
(58) Field of Classification Search
USPC ....... 707/792; 702/186; 709/223; 726/22, 24, 726/25; 713/189, 200
See application file for complete search history.

(56) References Cited

U.S. PATENT DOCUMENTS

| 7,096,368 | B2 * | 8/2006 | Kouznetsov et al. | ......... 713/189 |
| 7,171,690 | B2 * | 1/2007 | Kouznetsov et al. | ........... 726/22 |
| 7,269,602 | B2 * | 9/2007 | Kaappa | ................................. 1/1 |

(Continued)

FOREIGN PATENT DOCUMENTS

| CN | 101083554 | 12/2007 |
| CN | 101114933 | 1/2008 |
| CN | 101146346 | 3/2008 |

OTHER PUBLICATIONS

International Search Report of PCT/CN2009/000847 Dated Nov. 5, 2009 With English Translation.

*Primary Examiner* — Jean M Corrielus
(74) *Attorney, Agent, or Firm* — Workman Nydegger (57) ABSTRACT

A method for reporting and updating device description framework information. The device description framework information reporting method implements that the terminal device reports the updated device description framework information to DMS, which includes: updating the local device description framework information based on the changed structure of the device management tree; informing the updated device description framework information to DMS. The device description framework information updating method improves the validity of DMS's management over the terminal device. The updating method includes: receiving an updating inform about the device description framework information from a terminal device; acquiring the update of the device description framework information based on the updating inform; and updating the device description framework information of the terminal device stored locally based on the acquired device description framework information. Corresponding device, device management server and system are also provided.

3 Claims, 4 Drawing Sheets

(56) References Cited

U.S. PATENT DOCUMENTS

| | | | |
|---|---|---|---|
| 7,540,031 B2* | 5/2009 | Kouznetsov et al. | 726/25 |
| 7,827,611 B2* | 11/2010 | Kouznetsov et al. | 726/24 |
| 7,861,303 B2* | 12/2010 | Kouznetsov et al. | 726/24 |
| 7,937,071 B2* | 5/2011 | Lee | 455/411 |
| 2003/0233566 A1* | 12/2003 | Kouznetsov et al. | 713/200 |
| 2004/0003276 A1* | 1/2004 | Kouznetsov et al. | 713/200 |
| 2004/0010703 A1* | 1/2004 | Kouznetsov et al. | 713/200 |
| 2004/0025042 A1* | 2/2004 | Kouznetsov et al. | 713/200 |
| 2005/0010552 A1* | 1/2005 | Kaappa et al. | 707/1 |
| 2008/0114570 A1* | 5/2008 | Li et al. | 702/186 |
| 2008/0244049 A1* | 10/2008 | Normark et al. | 709/223 |
| 2009/0044185 A1* | 2/2009 | Krivopaltsev | 717/173 |
| 2010/0088121 A1* | 4/2010 | Shih et al. | 705/3 |
| 2010/0299739 A1* | 11/2010 | Chai et al. | 726/9 |
| 2011/0270882 A1* | 11/2011 | Jung et al. | 707/776 |
| 2012/0066367 A1* | 3/2012 | Chai et al. | 709/223 |

* cited by examiner

Fig.1    PRIOR ART

S21: Update local device description framework information according to a structural change of a device management tree

↓

S22: Notify a device management server about an update of the device description framework information

DEVICE DESCRIPTION FRAMEWORK INFORMATION REPORTING AND UPDATING METHOD, DEVICE AND SYSTEM

CROSS REFERENCE TO RELATED APPLICATIONS

The present application is a US National Stage of International Application No. PCT/CN2009/000847, filed 29 Jul. 2009, designating the United States, and claiming priority to Chinese Patent Application No. 200810117599.1 filed 1 Aug. 2008.

FIELD OF THE INVENTION

The present invention relates to the field of mobile communications and particularly to a technology of reporting and updating device description framework information.

BACKGROUND OF THE INVENTION

The Open Mobile Alliance Device Management (OMA DM) specification refers to a protocol of managing a user equipment in a mobile communication network by a remote server. A user equipment in compliance with the OMA DM specification shall be provided with a device management tree which is a tree-like data structure. The device management tree of the user equipment is an interface via which a Device Management Server (DMS) manages the user equipment in the Device Management (DM) protocol, and a Device Management Agent (DMA) of the user equipment is configured to interpret and execute various management commands issued from the DMS.

Figure 1:
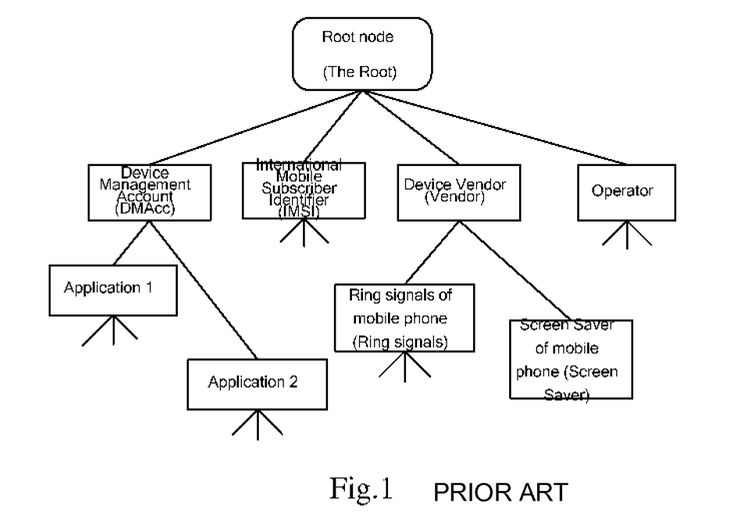
FIG. 1 illustrates a schematic diagram of a device management tree in the prior art.

Management Objects (MOs) available to the user equipment are stored as nodes in the device management tree, each of which is addressable with a unique Uniform Resource Identifier (URI), and the DMS manages each node in the device management tree for the purpose of controlling resources of the user equipment. As illustrated in FIG. 1 which is a schematic diagram of a device management tree, the device management tree includes a requisite root node and nodes attached to the root node, which may be divided into internal and leaf nodes by their locations, where the leaf node may be attached to the internal node. The nodes of the device management tree describe the resources of the user equipment, e.g., a Device Management Account (DMAcc), a Ring signal, a Screen Saver, an Operator, an International Mobile Subscriber Identifier (IMSI), a Vendor, various applications, etc. The nodes in the device management tree may be divided into permanent and dynamic nodes by their operability, where the permanent node refers to a node which can not be generated and deleted by the DMS in operation, e.g., a node built in the user equipment by a device vendor, and the dynamic node refers to a node allowable to be generated and deleted dynamically by the DMS in operation.

For convenient management of the DMS on the user equipment, the OMA DM specification defines a Device Description Framework (DDF) to indicate information on hierarchical relationships between, URIs and attributes, etc., of the MOs in the device management tree, which is stored in the form of a DDF document in the user equipment. Since the DMS knows the information on each node in the device management tree of the user equipment from the DDF document of the user equipment, the DMS shall store locally the DDF document of the user equipment in order to manage the user equipment.

In the prior art, the DDF document of the user equipment typically is retrieved from the user equipment and stored locally by the DMS in advance. The inventors have identified that during management of the DMS on the user equipment, if the device management tree of the user equipment is structurally changed, particularly due to a behavior local to the user equipment, for example, where a user adds or removes a piece of software or attachment to or from the user equipment, etc., then the user equipment can not report the structural change of the device management tree to the DMS so that the DMS can not update in synchronization the locally stored DDF document according to the structural change of the device management tree but instead may manage the user equipment still based on the locally pre-stored DDF document, thus resulting in a failure of the DMS to address or otherwise manage properly any management object changed in the user equipment and consequently degrading effective management of the DMS on the user equipment.

SUMMARY OF THE INVENTION

Embodiments of the invention provide a method and user equipment for reporting device description framework information so that the user equipment can report voluntarily an update of the device description framework information to a device management server when a device management tree local to the user equipment is structurally changed.

Embodiments of the invention provide a method, device management server and system for updating device description framework information so that timely retrieval of updated device description framework information is possible when a device management tree local to a user equipment is structurally changed to thereby improve effective management of the device management server on the user equipment. An embodiment of the invention provides a method for reporting device description framework information, which includes:

updating local device description framework information according to a structural change of a device management tree; and notifying a device management server about an update of the device description framework information.

Preferably in the reporting method, a user equipment transmits to the device management server a report message of reporting the update of the device description framework information, which carries updated device description framework information or an updated part of the device description framework information so that the user equipment reports the update of the device description framework information in a timely way to the device management server, thereby preparing for real time updating of device description framework information in the device management server.

Or preferably in the reporting method, when the device management tree is structurally changed, the user equipment updates the local device description framework information and transmits to the device management server a notification message of notifying the update of the device description framework information, which carries address information of updated device description framework information or of an updated part of the device description framework information, and when a Get command is received from the device management server, the user equipment returns the updated device description framework information or the updated part of the device description framework information. The notification message of notifying the update of the device description framework information is transmitted to thereby enable the user equipment to notify the device management server in a timely way that the device description framework information has been updated; the address information of the updated device description framework information or of the updated part of the device description framework information is carried in the notification message to thereby facilitate retrieving of the device description framework information by the device management server; and the updated device description framework information or the updated part of the device description framework information is returned upon reception of the Get command from the device management server to thereby alleviate a burden upon the device management server due to reporting of the device description framework information.

An embodiment of the invention provides a user equipment including:

a management unit configured to update local device description framework information according to a structural change of a device management tree; and a reporting unit configured to notify a device management server about the update of the device description framework information.

An embodiment of the invention provides a method for updating device description framework information, which includes:

receiving an update notification, transmitted from a user equipment, of notifying an update of a device description framework information;

retrieving the update of the device description framework information from the update notification; and updating locally stored device description framework information of the user equipment with a retrieved update of the device description framework information.

Preferably in the updating method, the update notification is a report message of reporting the update of the device description framework information, which carries updated device description framework information or an updated part of the device description framework information; and retrieving the update of the device description framework information from the update notification includes retrieving the updated device description framework information or the updated part of the device description framework information from the report message, thereby implementing a real time updating of the locally stored device description framework information and improving effective management on the user equipment.

Or preferably in the updating method, the update notification is a notification message of notifying the update of the device description framework information, which carries address information of updated device description framework information or of an updated part of the device description framework information; and when necessary, the updated device description framework information or the updated part of the device description framework information may be retrieved from the user equipment according to the address information carried in the notification message to update the locally stored device description framework information of the user equipment, thereby implementing a voluntary updating of the locally stored device description framework information and improving effective management on the user equipment.

An embodiment of the invention provides a device management server including:

a receiving unit configured to receive an update notification, transmitted from a user equipment, of notifying an update of a device description framework information;

a retrieving unit configured to retrieve the update of the device description framework information from the update notification; and an updating unit configured to update locally stored device description framework information of the user equipment with a retrieved update of the device description framework information.

An embodiment of the invention provides a system for updating device description framework information, which includes:

a user equipment configured to update local device description framework information according to a structural change of a device management tree and to notify a device management server about the update of the device description framework information; and the device management server configured to receive a notification from the user equipment, to retrieve the update of the device description framework information from the notification, and to update locally stored device description framework information of the user equipment with a retrieved update of the device description framework information.

DETAILED DESCRIPTION OF THE EMBODIMENTS

Embodiments of the invention provide a method for reporting and updating DDF information which typically is stored in the form of a DDF document in a user equipment and a DMS, therefore reporting and updating of the DDF information will be described in the embodiments of the invention by taking reporting and updating of the DDF document as an example. However the invention is not limited thereto, that is, the invention may also be applicable to a situation in which the DDF information is stored in any form in the user equipment and the DMS.

When a device management tree in a user equipment is structurally changed, the user equipment can not report the change of a DMS so that the DMS can not update its locally stored DDF document corresponding to the structure of the device management tree in the user equipment and consequently can not manage effectively any changed management object of the user equipment, for example, can not address properly a management object newly added to the device management tree, thus degrading effective management of the DMS on the user equipment. In order to solve the foregoing problem, an embodiment of the invention provides a method for reporting DDF information at the side of the user equipment and correspondingly a method for updating DDF information at the side of the DMS so that the user equipment can report updated DDF information to the DMS and the DMS can update its locally stored DDF information to thereby improve effective management of the DMS on the user equipment.

Figure 2:
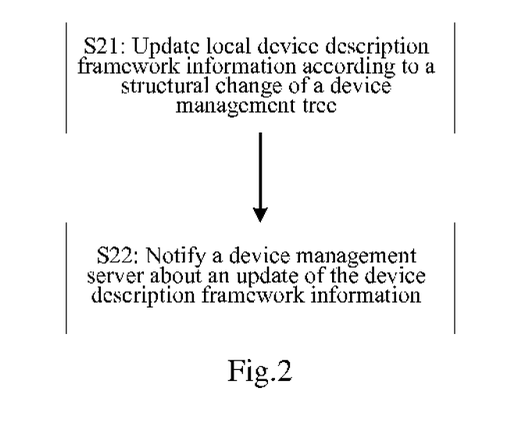
FIG. 2 illustrates a schematic diagram of a flow chart of a method for reporting device description framework information according to an embodiment of the invention.

As illustrated in FIG. 2, an embodiment of the invention provides a method for reporting a DDF information, which includes:

S21: Local DDF information is updated according to a structural change of a device management tree. A user equipment updates the local DDF information, for example, updates a locally stored DDF document, when the device management tree is structurally changed; and S22. A DMS is notified about the update of the DDF information. For example, the user equipment notifies the device management server about updated DDF document.

Figure 3:
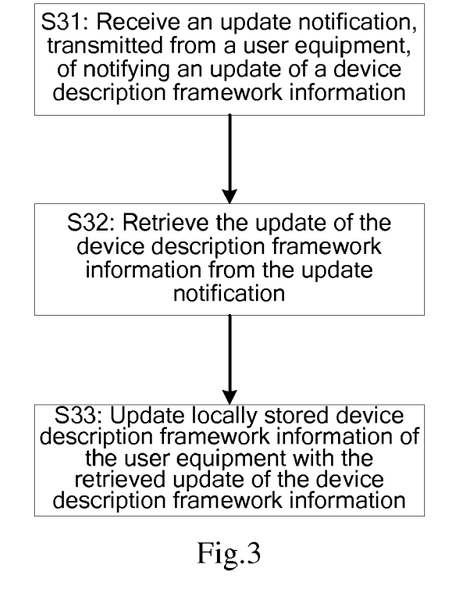
FIG. 3 illustrates a schematic diagram of a flow chart of a method for updating device description framework information according to an embodiment of the invention.

Correspondingly, an embodiment of the invention provides a method for updating DDF information, as illustrated in FIG. 3, which includes:

S31. A DMS receives an update notification, transmitted from a user equipment, of notifying an update of a DDF information;

S32. The DMS retrieves the update of the DDF information from the update notification; and S33. The DMS updates locally stored DDF information of the corresponding user equipment according to the retrieved update of the DDF information.

The methods for reporting and for updating DDF information according to the invention can be embodied in various ways and will be described in embodiments of the invention by taking two implementations as examples. In a first implementation, in the method for reporting DDF information, the user equipment updates a local DDF document according to the structural change of the device management tree in the operation S21 and notifies the device management server about the update of the DDF document in the operation S22 by transmitting to the DMS a report message, of reporting the update of the DDF document, which carries updated DDF document; and correspondingly in the method for updating the DDF information, the DMS receives the report message from the user equipment in the operation S31, retrieves the updated DDF document directly from the received report message in the operation S32, and updates a locally stored DDF document of the user equipment in the operation S33 so that the DMS can manage effectively a management object of the user equipment based upon the updated DDF document, for example, can address properly a newly added management object, thereby improving effective management of the DMS on the user equipment. In a second implementation, in the method for reporting DDF information, the user equipment updates a local DFF document in the operation S21 and transmits to the DMS a notification message, of notifying the update of the DDF document, which carries address information of updated DDF document in the operation S22; and correspondingly in the method for updating the DDF information, the DMS knows from the received notification message that the DDF document of the user equipment has been updated as well as the address information of the updated DDF document so that the DMS can retrieve voluntarily the updated DDF document from the user equipment according to the address information when necessary and update a locally stored DDF document of the user equipment and thus can manage effectively a management object of the user equipment based upon the updated DDF document to thereby improve effective management of the DMS on the user equipment.

However it shall be appreciated that the methods for reporting and for updating DDF information according to the invention can be otherwise embodied but are not limited to the two implementations as described in the foregoing embodiments of the invention so long as the DMS can retrieve the updated DDF information. For example, in the first implementation according to the embodiment of the invention, the report message may carry an updated part of the DDF document instead of the entire updated DDF document, so that the DMS can also retrieve the updated DDF document while conserving a traffic flow transmitted over a network. Similarly in the second implementation according to the embodiment of the invention, the report message may carry address information of an updated part of the DDF document instead that of the entire updated DDF document.

Furthermore, the update notification in the operation S22 may be triggered by the structural change of the device management tree in the operation S21, so that the corresponding DDF document in the DMS can be updated in a timely way.

The implementations according to the embodiments of the invention will be introduced in details hereinafter with reference to the drawings in a first embodiment relating to a particular embodiment of the first implementation and a second embodiment relating to that of the second implementation.

The First Embodiment

In the present embodiment, the report message of reporting the update of the DDF document may be embodied by extending an existing Generic Alert message which is a message transmitted from a user equipment to a DMS as defined in the DM protocol with a format consisted of the four fields of message type, message source address, message content type and message data.

The field of message type indicates that the message is a Generic Alert message, the field of message source address indicates the source address of the message and provides address information in the URI, the field of message content type indicates the type of data carried in the message (see a part of message content types defined in the DM protocol), and the field of message data includes content of the data carried in the message.

The existing Generic Alert message may be extended with an additional message content type indicating that the DDF document has been updated, and the field of message data corresponding to this message content type carries the updated DDF document. Table 1 depicts a format of the extended message.

TABLE 1

| | |
|---|---|
| \<Alert\> | Message |
|   \<CmdID\>2\</CmdID\> | type |
|   \<Data\>1226\</Data\>   \<!-- Generic Alert --\> | |
| \<Item\> | Message |
|   \<Source\>\<LocURI\>./\</LocURI\>\</Source\> | source address |
|   \<Meta\> | Message |
|     \<Type xmlns="syncml:metinf"\> | content |
|       org.openmobilealliance.dm.ddf.update | type |
|         \<!DDF document has been updated\> | |
|     \</Type\> | |
|     \<Format xmlns="syncml:metinf"\>xml\</Format\> | |
|   \</Meta\> | |

TABLE 1-continued

| | |
|---|---|
| <Data><br>   <!-- Updated DDF document--> </Data><br></Item><br></Alert> | Message<br>data |

Figure 4:
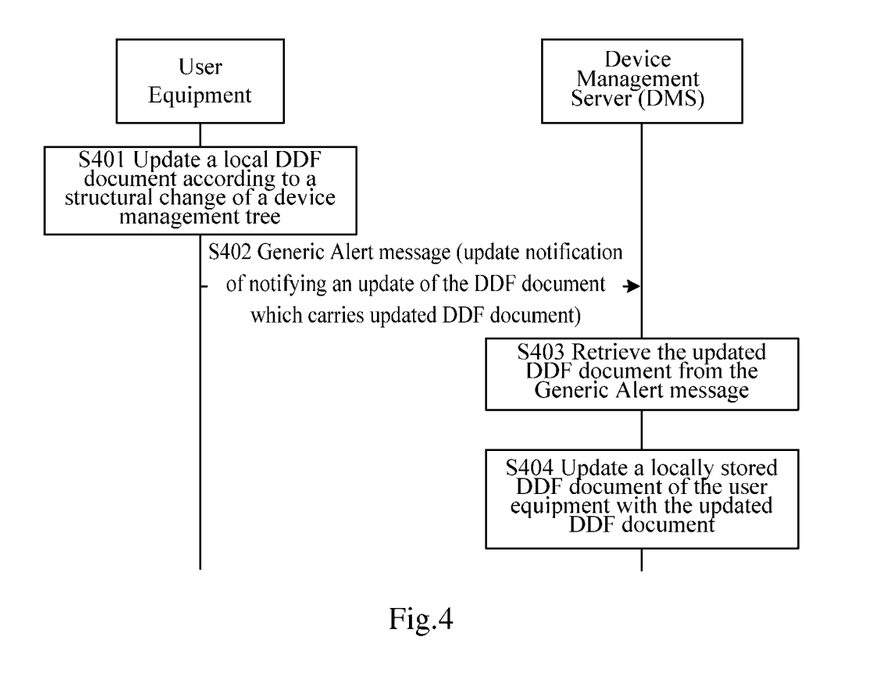
FIG. 4 illustrates a flow chart of an example of a method for reporting and updating device description framework information according to an embodiment of the invention.

Based upon the extended Generic Alert message, there is provided a method for reporting and updating DDF information, a flow chart of which is as illustrated in FIG. 4 and which includes the following operations S401 to S404.

S401. A user equipment updates a local DDF document according to a structural change of a device management tree in the user equipment;

The device management tree in the user equipment may be structurally changed due to a local status change of the user equipment. If a piece of software or attachment is added, removed or modified to, from or in the user equipment, then a corresponding node is added, removed or modified to, from or in the device management tree of the user equipment, so that the device management tree is structurally changed. According to the structural change of the device management tree, the user equipment modifies the current DDF document by adding, removing or modifying a description of a corresponding MO in the device management tree to, from or in the current DDF document to thereby update locally the DDF document;

S402. The user equipment transmits to the DMS the extended Generic Alert message with the field of message content type indicating that the DDF document has been updated and the field of message data being the updated DDF document;

S403. The DMS retrieves the updated DDF document from the Generic Alert message upon reception of the Generic Alert message transmitted from the user equipment; and S404. The DMS updates a locally stored DDF document of the user equipment with the updated DDF document.

As can be apparent, the operations S401 and S402 are examples of performing the operations S21 and S22 respectively, and the operations S403 and S404 are examples of performing the operations S32 and S33 respectively.

In the methods for reporting and for updating DDF information according to the first embodiment, the user equipment updates the local DDF document according to the structural change of the device management tree and transmits to the DMS the Generic Alert message with the field of message content type indicating that the DDF document has been updated and the field of message data being the updated DDF document so that the user equipment can report the updated DDF document in a timely way to the DMS, thereby preparing for a real time updating of the DDF document in the DMS; and correspondingly, the DMS retrieves the updated DDF document from the received Generic Alert message and updates the locally stored DDF document of the user equipment to thereby perform a real time updating of the locally stored DDF document and improve effective management on the user equipment.

Figure 5:
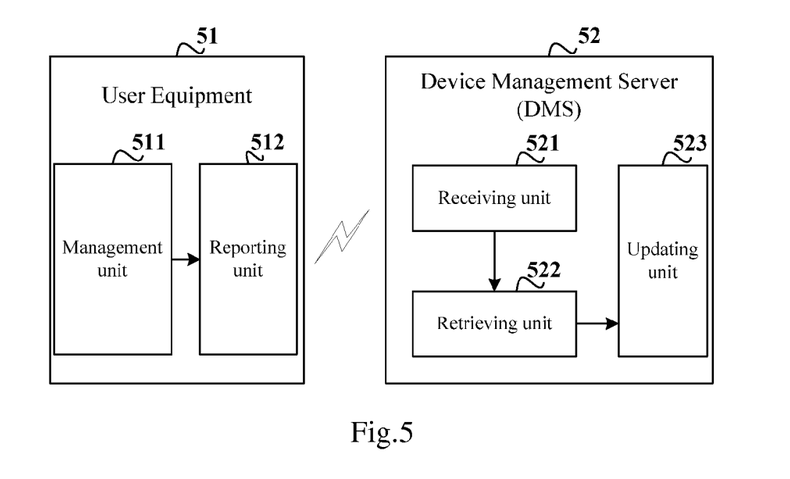
FIG. 5 illustrates a block diagram of an example of a system for updating device description framework information according to an embodiment of the invention.

An embodiment of the invention correspondingly provides a system for updating DDF information as illustrated in FIG. 5, which includes a user equipment 51 and a DMS 52, where:

the user equipment 51 is configured to update a local DDF document according to a structural change of a device management tree and to transmit a report message, of reporting the update of the DDF document, which carries updated DDF document;

the DMS 52 is configured to receive the report message, to retrieve the updated DDF document from the report message, and to update a locally stored DDF document of the user equipment 51 with the updated DDF document.

Particularly, an illustrative structure of the user equipment 51 includes:

a management unit 511 configured to update the local DDF document according to the structural change of the device management tree; and a reporting unit 512 configured to transmit to the DMS the report message, of reporting the update of the DDF document, which carries the updated DDF document.

An illustrative structure of the DMS 52 includes:

a receiving unit 521 configured to receive the report message transmitted from the user equipment, of reporting the update of the DDF document, which carries the updated DDF document;

an retrieving unit 522 configured to retrieve the updated DDF document from the report message; and an updating unit 523 configured to update the locally stored DDF document of the user equipment with the updated DDF document.

It shall be noted that alternatively in the present embodiment, the report message may carry an updated part of the DDF document instead of the entire updated DDF document, and the DMS may retrieve the updated part of the DDF document so that the DMS can also retrieve the updated DDF document while conserving a traffic flow transmitted over a network. In this case, a message content type added in the extended existing Generic Alert message indicates that the DDF document has been partially updated, and the field of message data corresponding to this message content type carries the updated part of the DDF document instead of the entire updated DDF document.

The Second Embodiment

Based upon the same inventive concept, the notification message of notifying the update of the DDF document in the present embodiment can also be embodied by extending the existing Generic Alert message with a further message content type notifying that the DDF document has been updated, and the data of message data corresponding to the message content type carries address information of the updated DDF document, i.e., the URI of the updated DDF document stored on the user equipment. Table 2 depicts a format of the extended message.

TABLE 2

| | |
|---|---|
| <Alert><br>  <CmdID>2</CmdID> | Message<br>type |
|   <Data>1226</Data>  <!-- Generic Alert --><br><Item> | Message |
|   <Source><LocURI>./</LocURI></Source> | source<br>address |
|   <Meta><br>    <Type xmlns="syncml:metinf"><br>      org.openmobilealliance.dm.ddf.updatenotify<br>        <!Notify that DDF document has been updated><br>    </Type><br>    <Format xmlns="syncml:metinf">xml</Format><br>  </Meta> | Message<br>content<br>type |
|   <Data><br>    <Address information of the updated DDF document<br>    (i.e., the URI of the updated DDF document stored on<br>    the user equipment )></Data><br></Item><br></Alert> | Message<br>data |

Figure 6:
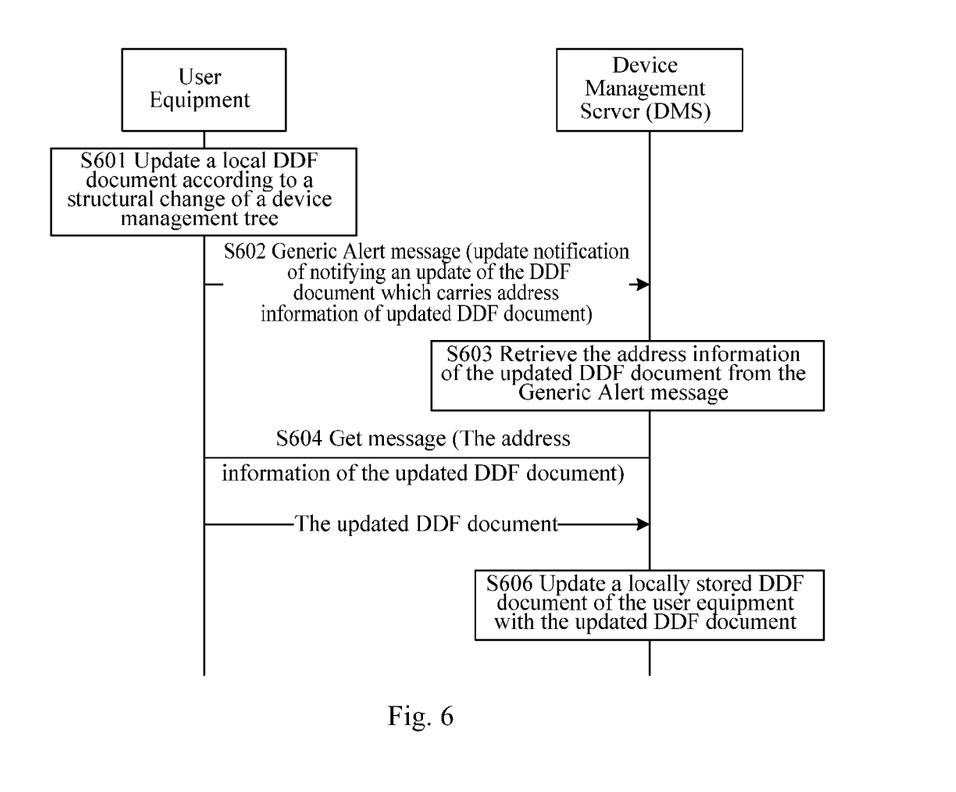
FIG. 6 illustrates a flow chart of another example of a method for reporting and updating device description framework information according to an embodiment of the invention.

Based upon the extended Generic Alert message, there is provided a method for reporting and updating DDF information, a flow chart of which is as illustrated in FIG. 6 and which includes the following operations S601 to S606.

S601. A user equipment updates a local DDF document according to a structural change of a device management tree in the user equipment;

S602. The user equipment transmits to a DMS an extended Generic Alert message with a field of message content type notifying that the DDF document has been updated and a field of message data being address information of updated DDF document;

S603. The DMS retrieves the address information of the updated DDF document from the Generic Alert message upon reception of the Generic Alert message transmitted from the user equipment;

S604. The DMS generates and transmits to the user equipment a Get (retrieval) command to retrieve the updated DDF, which carries the address information of the updated DDF document, i.e., the URI of the DDF document stored on the user equipment;

S605. The user equipment returns the updated DDF document in response to the received Get command; and S606. The DMS updates locally stored DDF document of the user equipment with the updated DDF document.

Particularly, a data packet of the Get command transmitted from the DMS is structured as follows:

```
<Get>
    <CmdID>4</CmdID>
    <Item>
        <Target>
            <LocURI> Address information of updated DDF document
            </LocURI>
        </Target>
    </Item>
<Get>
```

As can be apparent, the operations S601-S602 and S605 are examples of performing the operations S21 and S22 respectively, and the operations S603-S604 and S606 are examples of performing the operations S32 and S33 respectively.

In the methods for reporting and for updating DDF information according to the second embodiment, the user equipment updates the local DDF document based on the structural change of the device management tree and transmits to the DMS the Generic Alert message with the field of message content type notifying that the DDF document has been updated so that when the device management tree is structurally changed, the user equipment may notify the DMS in a timely way about the update of the DDF document; the field of message data of the Generic Alert message is the address information of the updated DDF document so that the DMS can retrieve the updated DDF document; and the user equipment returns the updated DDF document only upon reception of the Get command from the DMS to thereby alleviate a burden upon the DMS due to the reported DDF document. Correspondingly the DMS knows from the received Generic Alert message that the DDF document has been updated as well as the address information of the updated DDF document so that the DMS can retrieve the updated DDF document from the user equipment through transmitting the Get command when necessary and update the locally stored DDF document of the user equipment to thereby update voluntarily the locally stored DDF document and improve effective management of the DMS on the user equipment.

Figure 7:
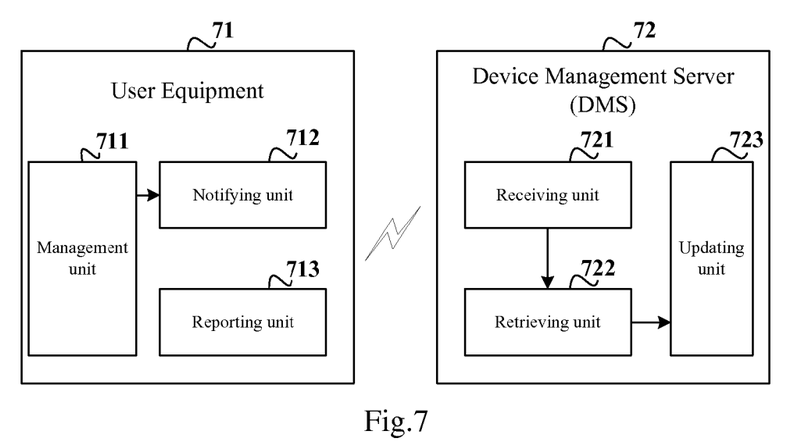
FIG. 7 illustrates a block diagram of another example of a system for updating device description framework information according to an embodiment of the invention.

An embodiment of the invention correspondingly provides a system for updating DDF information as illustrated in FIG. 7, which includes a user equipment 71 and a DMS 72, where:

the user equipment 71 is configured to update a local DDF document based on a structural change of a device management tree and to transmit a DDF document update notification message carrying address information of updated DDF document, and to return the updated DDF document in response to a Get command carrying the address information; and the DMS 72 is configured to receive the notification message, to transmit the Get command to retrieve the updated DDF document, and to update locally stored DDF document of the user equipment 71 with the updated DDF document.

Particularly, an illustrative structure of the user equipment 71 includes:

a management unit 711 configured to update the local DDF document based on the structural change of the device management tree;

a notifying unit 712 configured to transmit to the DMS a notification message, of notifying the update of the DDF document, which carries the address information of the updated DDF document; and a reporting unit 713 configured to return the updated DDF document in response to the Get command carrying the address information transmitted from the DMS.

An illustrative structure of the DMS 72 includes:

a receiving unit 721 configured to receive the notification message transmitted from the user equipment, of notifying the update of the DDF document, which carries the address information of the updated DDF document;

an retrieving unit 722 configured to transmit the Get command carrying the address information to the user equipment to retrieve the updated DDF document; and an updating unit 723 configured to update the locally stored DDF document of the user equipment with the updated DDF document.

It shall be noted that alternatively in the present embodiment, the notification message may carry address information of an updated part of the DDF document instead of that of the entire updated DDF document, the Get command transmitted from the DMS may carry the address information of the updated part of the DDF document and the DMS may also retrieve the updated part of the DDF document so that the DMS can equally retrieve the updated DDF document while conserving a traffic flow transmitted over a network. In this case, the message content type added in the extended Generic Alert message notifies that the DDF document has been partially updated, and the field of message data corresponding to the message content type carries the address information of the updated part of the DDF document instead of that of the entire updated DDF document.

In the embodiments of the invention, the user equipment carries the DDF document, the updated part thereof or the address information of the DDF document or of the updated part thereof in the extended Generic Alert message in the DM protocol. Of course, the user equipment may alternatively carry the DDF document, the updated part thereof or the address information of the DDF document or of the updated part thereof in a new message defined in the DM protocol or in a short message or Email, through the FTP or any other externally carrying approach to thereby improve flexible reporting of the DDF document for a wider range of networks and environments to which the invention is applicable.

Evidently those skilled in the art may make various modifications and variations to the invention without departing from the scope of the invention. Accordingly the invention is also intended to encompass these modifications and variations provided the modifications and variations come into the scope of the claims appended to the invention and their equivalents.

The invention claimed is:

1. A method for reporting device description framework information, comprising updating local device description framework information based on a structural change of a device management tree, wherein the device description framework information comprises hierarchical relationships between management objects in the device management tree, Uniform Resource Identifiers of the management objects, and attributes of the management objects; and notifying a device management server about an update of the device description framework information;

wherein notifying the device management server about an update of the device description framework information comprises:

transmitting to the device management server a notification message, of notifying the update of the device description framework information, which carries address information of updated device description framework information or of an updated part of the device description framework information; and returning the updated device description framework information or the updated part of the device description framework information in response to a Get command carrying the address information transmitted from the device management server;

and wherein the notification message is an extended Generic Alert message with a field of message content type notifying that the device description framework information has been updated or partially updated and a field of message data being the address information of the updated device description framework information or of the updated part of the device description framework information.

2. The method of claim 1, wherein, the structural change of the device management tree triggers the notifying of the update of the device description framework information to the device management server.

3. A method for updating device description framework information, comprising:

receiving an update notification, of notifying an update of device description framework information, transmitted from a user equipment, wherein the device description framework information comprises hierarchical relationships between management objects in the device management tree, Uniform Resource Identifiers of the management objects, and attributes of the management objects;

retrieving the update of the device description framework information from the update notification; and updating locally stored device description framework information of the user equipment with retrieved update of the device description framework information;

wherein the update notification is a notification message, of notifying the update of the device description framework information, which carries address information of updated device description framework information or of an updated part of the device description framework information; and wherein retrieving the update of the device description framework information from the update notification comprises: transmitting a Get command carrying the address information to the user equipment, and retrieving the updated device description framework information or the updated part of the device description framework information from a message returned from the user equipment;

and wherein the notification message is an extended Generic Alert message with a field of message content type notifying that the device description framework information has been updated or partially updated and a field of message data being the address information of the updated device description framework information or of the updated part of the device description framework information.

* * * * *